Sept. 19, 1933.          R. D. McINTOSH                1,927,463
              REFACING TOOL FOR THREADED MEMBERS
                      Filed July 26, 1929

Inventor:
Robert D. McIntosh
By John Howard McElroy
         his Atty.

Patented Sept. 19, 1933

1,927,463

UNITED STATES PATENT OFFICE 1,927,463

REFACING TOOL FOR THREADED MEMBERS

Robert D. McIntosh, River Forest, Ill., assignor to The Imperial Brass Manufacturing Company, Chicago, Ill., a corporation of Illinois Application July 26, 1929. Serial No. 381,126

4 Claims. (Cl. 90—12.5)

My invention is concerned with refacing tools for threaded members, and is designed primarily to bevel off the ends of threaded pipe connections after they have been disassembled, so that they can be refaced, replaced, and a perfect joint made.

To this end, it consists of a bearing cup or sleeve concentrically threaded at its lower end so that it can be screwed firmly on to the connection, and having its concentric cylindrical interior of the proper diameter to receive and permit the rotation thereon of the body of a facing tool, the cutting edges of which bevel the contacting end of the connection concentrically with the threaded portion, so as to enable a new and perfect joint to be made, even if it should happen that the bore of the connection is slightly eccentric.

To illustrate my invention, I annex hereto a sheet of drawing in which the same reference characters are used to designate identical parts in all the figures, of which,—

Figure 1:
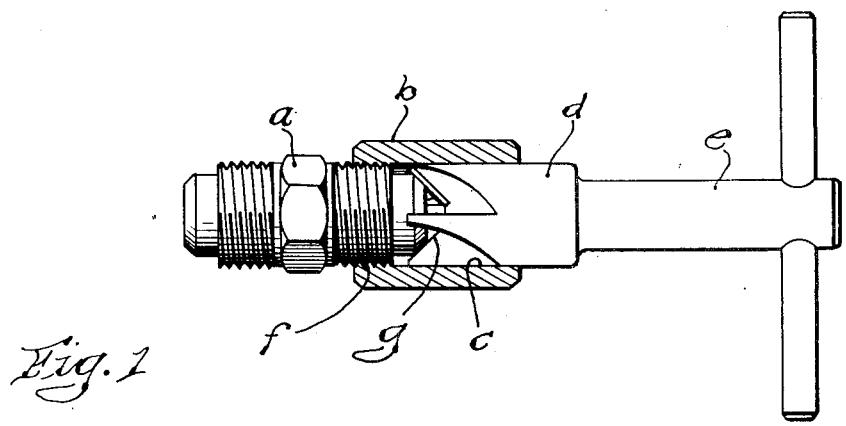
Fig. 1 is a side elevation of the tool in use with the bearing cup in central longitudinal section.
Figure 2:
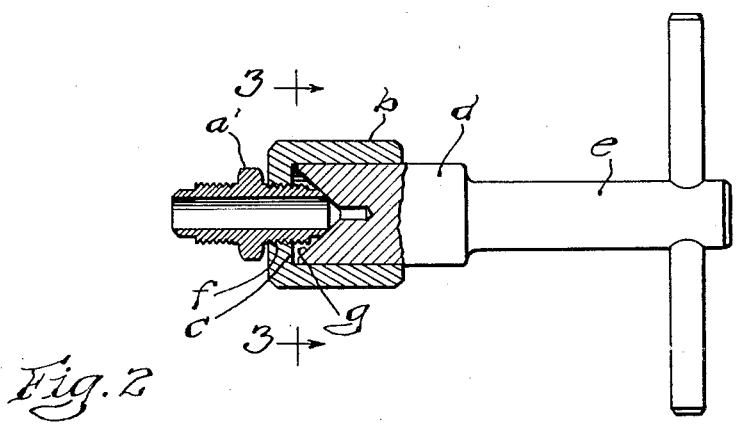
Fig. 2 is a similar view, but showing a smaller connection with the proper cup for the same, the connection, cup, and a portion of the facing tool being in central longitudinal section.
Figure 3:
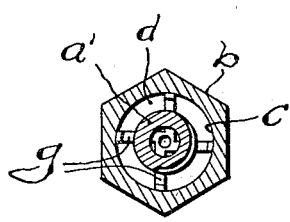
Fig. 3 is a section on the line 3—3 of Fig. 2.

I have illustrated my invention as used in resurfacing a connection $a$, of common form, which has the two beveled ends with the two threaded portions separated by the hexagonal portion so that the same can be turned as may be necessary in forming the joint. The cup $b$ is preferably hexagonal in cross section, as seen in Fig. 3, and will have therein the cylindrical bore $c$ of the proper diameter to receive the body $d$ of the facing tool $e$. The bottom of the bearing cup is provided with a threaded aperture $f$ concentric with the cylindrical interior, and of the proper size to be screwed on to the particular connection with which it is intended to be used, and it will be noted that in Fig. 1, I show a cup $b$ having the same internal diameter as that shown in Fig. 2, but with a larger threaded opening for the larger connection, as compared with that shown in Fig. 2. The facing tool $e$ may be of any desired construction, provided that it has the cylindrical body $d$ adapted to fit in the cup $b$, and also the necessary cutting edges $g$ customarily employed in such devices.

The use of the apparatus will be obvious, as all that is necessary is to screw the bearing cup on to the end of the connection it is desired to reface, and then insert the facing tool and turn the same.

What I claim as new, and desire to secure by Letters Patent of the United States, is:

1. In refacing apparatus, the combination with a cup having a cylindrical interior and its bottom perforated by a threaded aperture, of a facing tool adapted to co-operate therewith and consisting of a body portion having at one end a handle and at the other a cylindrical portion adapted to fit in the cylindrical interior of the cup and terminating in cutting teeth.

2. In a refacing apparatus for threaded nipples, the combination with a sleeve having one end provided with internal threads concentric with its cylindrical interior, the other end being open and having as great an internal diameter as any portion thereof, of a cutting tool comprising a handle and a cutting head, the diameter of the head being such that it fits snugly in the sleeve so that by rotating the tool in the sleeve the nipple may be refaced concentrically with its threaded portion.

3. In refacing apparatus, a facing tool adapted to cooperate with any of a plurality of cups having identical cylindrical interiors but with their bottoms each perforated by a threaded aperture of a different size from those in the other cups and concentric with the cylindrical interiors, and consisting of a body portion having at one end a handle and at the other, a cylindrical portion adapted to fit in the cylindrical interior of any of the cups and terminating in cutting teeth.

4. In a refacing apparatus for threaded nipples, a cutting tool comprising a handle and a cutting head, the diameter of the head being such that it is adapted to fit snugly in any of a plurality of cups having identical cylindrical interiors, but with their bottoms each perforated by threaded apertures of different sizes from those in the other cups and concentric with the cylindrical interiors, each of said cups having the other end open and having as great an internal diameter as any portion thereof, so that by rotating the tool therein, the nipple upon which the cup is screwed may be refaced concentrically with its threaded portion.

ROBERT D. McINTOSH.